United States Patent
Finn et al.

(10) Patent No.: US 9,461,979 B2
(45) Date of Patent: Oct. 4, 2016

(54) METHOD AND SYSTEM FOR INCLUDING NETWORK SECURITY INFORMATION IN A FRAME

(71) Applicant: Cisco Technology, Inc., San Jose, CA (US)

(72) Inventors: Norman W. Finn, Livermore, CA (US); Michael R. Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 47 days.

(21) Appl. No.: 14/051,854

(22) Filed: Oct. 11, 2013

(65) Prior Publication Data
US 2015/0106896 A1    Apr. 16, 2015

(51) Int. Cl.
*H04L 29/00*    (2006.01)
*H04L 29/06*    (2006.01)

(52) U.S. Cl.
CPC ............ *H04L 63/08* (2013.01); *H04L 63/104* (2013.01)

(58) Field of Classification Search
USPC .................................................. 713/155–159
See application file for complete search history.

(56) References Cited

U.S. PATENT DOCUMENTS

| | | | |
|---|---|---|---|
| 4,922,486 A | 5/1990 | Lidinsky et al. | 370/60 |
| 5,017,917 A | 5/1991 | Fisher et al. | 340/14.1 |
| 5,113,442 A | 5/1992 | Moir | 713/167 |
| 5,251,205 A | 10/1993 | Callon et al. | 370/60 |
| 5,615,264 A | 3/1997 | Kazmierczak et al. | 705/52 |
| 5,764,762 A | 6/1998 | Kazmierczak et al. | 705/52 |
| 5,787,427 A | 7/1998 | Benantar et al. | 707/9 |
| 5,845,068 A | 12/1998 | Winiger | 395/186 |
| 5,911,143 A | 6/1999 | Deinhart et al. | 707/103 |
| 5,941,947 A | 8/1999 | Brown et al. | 709/225 |
| 5,968,177 A | 10/1999 | Batten-Carew et al. | 726/4 |
| 6,014,666 A | 1/2000 | Helland et al. | 707/9 |
| 6,023,765 A | 2/2000 | Kuhn | 713/200 |
| 6,052,456 A | 4/2000 | Huang | 379/201.04 |
| 6,088,659 A | 7/2000 | Kelley et al. | 702/62 |
| 6,092,191 A | 7/2000 | Shimbo et al. | 713/153 |

(Continued)

FOREIGN PATENT DOCUMENTS

| | | | | |
|---|---|---|---|---|
| EP | 0 465 016 A2 | 6/1991 | | G06F 1/00 |
| EP | 0 697 662 A1 | 2/1996 | | 12/14 |

(Continued)

OTHER PUBLICATIONS

Wang, Ning and Pavlou, George, Scalable Sender Access Control for Bi-directional Multicast Routing, Computer Networks, Elsevier Science Publishers R.V., vol. 43, No. 5, Dec. 5, 2003, pp. 539-555.

(Continued)

*Primary Examiner* — Ghazal Shehni
(74) *Attorney, Agent, or Firm* — Campbell Stephenson LLP

(57) ABSTRACT

A method and apparatus for including network security information in a frame is disclosed. Network security information is included in a secure portion of overhead of a frame. The network security information is configured to facilitate network security. A network device configured to process a frame is also disclosed. The frame includes frame security information and network security information. The frame security information is configured to facilitate securing a portion of overhead of the frame, and the network security information is located in the secure portion of the overhead of the frame and is configured to facilitate network security.

20 Claims, 6 Drawing Sheets

(56) References Cited

U.S. PATENT DOCUMENTS

| | | | |
|---|---|---|---|
| 6,202,066 B1 | 3/2001 | Barkley et al. | 707/9 |
| 6,212,558 B1 | 4/2001 | Antur et al. | 709/221 |
| 6,233,618 B1 | 5/2001 | Shannon | 709/229 |
| 6,271,946 B1 | 8/2001 | Chang et al. | 398/79 |
| 6,289,462 B1 | 9/2001 | McNabb et al. | 713/201 |
| 6,292,798 B1 | 9/2001 | Dockter et al. | 707/9 |
| 6,292,900 B1 | 9/2001 | Ngo et al. | 713/200 |
| 6,304,973 B1 | 10/2001 | Williams | 713/201 |
| 6,405,259 B1 | 6/2002 | Cheston et al. | 709/245 |
| 6,449,643 B1 | 9/2002 | Hyndman et al. | 709/223 |
| 6,711,172 B1 | 3/2004 | Li | 370/401 |
| 6,754,214 B1 | 6/2004 | Mahalingaiah | 370/392 |
| 6,823,462 B1 | 11/2004 | Cheng et al. | 726/15 |
| 6,973,057 B1 | 12/2005 | Forslow | 370/328 |
| 6,985,948 B2 | 1/2006 | Taguchi et al. | 709/225 |
| 7,000,120 B1 * | 2/2006 | Koodli et al. | 713/1 |
| 7,023,863 B1 | 4/2006 | Naudus et al. | 370/401 |
| 7,032,243 B2 | 4/2006 | Leerssen et al. | 726/17 |
| 7,136,374 B1 | 11/2006 | Kompella | 370/352 |
| 7,185,365 B2 | 2/2007 | Tang et al. | 726/13 |
| 7,207,062 B2 | 4/2007 | Brustoloni | 726/13 |
| 7,284,269 B2 | 10/2007 | Marquet et al. | 726/13 |
| 7,350,077 B2 | 3/2008 | Meier et al. | 713/171 |
| 7,417,950 B2 | 8/2008 | Hofmeister et al. | 370/230 |
| 7,434,045 B1 | 10/2008 | Enderwick et al. | 713/158 |
| 7,437,755 B2 | 10/2008 | Farino et al. | 726/5 |
| 7,506,102 B2 | 3/2009 | Lev-Ran et al. | 711/118 |
| 7,519,986 B2 | 4/2009 | Singhal | 762/2 |
| 7,530,112 B2 | 5/2009 | Smith | 726/28 |
| 7,594,262 B2 | 9/2009 | Hanzlik et al. | 726/15 |
| 7,660,259 B1 | 2/2010 | Grosser et al. | 370/252 |
| 2002/0026592 A1 | 2/2002 | Gavrila et al. | 713/201 |
| 2002/0034962 A1 | 3/2002 | Yokoyama | 455/519 |
| 2002/0035635 A1 | 3/2002 | Holden | 709/230 |
| 2002/0062190 A1 | 5/2002 | Hameleers et al. | 701/117 |
| 2002/0184521 A1 | 12/2002 | Lucovsky et al. | 713/200 |
| 2003/0051155 A1 | 3/2003 | Martin | 713/201 |
| 2003/0065799 A1 | 4/2003 | Kitamura | 709/230 |
| 2003/0088786 A1 | 5/2003 | Moran et al. | 713/201 |
| 2003/0110268 A1 | 6/2003 | Kermarec et al. | 709/227 |
| 2003/0140246 A1 | 7/2003 | Kammer et al. | 713/201 |
| 2003/0145232 A1 | 7/2003 | Poletto et al. | 713/201 |
| 2003/0154400 A1 | 8/2003 | Pirttimaa et al. | 713/201 |
| 2003/0177381 A1 | 9/2003 | Ofek et al. | 713/200 |
| 2003/0196108 A1 | 10/2003 | Kung | 713/200 |
| 2004/0017816 A1 | 1/2004 | Ishwar et al. | 370/395.53 |
| 2004/0044908 A1 | 3/2004 | Markham et al. | 713/201 |
| 2004/0064688 A1 | 4/2004 | Jacobs | 713/150 |
| 2004/0073788 A1 | 4/2004 | Kim et al. | 713/160 |
| 2004/0156313 A1 | 8/2004 | Hofmeister et al. | 370/229 |
| 2004/0160903 A1 | 8/2004 | Gai et al. | 370/254 |
| 2004/0181690 A1 | 9/2004 | Rothermel et al. | 713/201 |
| 2004/0202171 A1 | 10/2004 | Hama | 370/395.1 |
| 2004/0264697 A1 | 12/2004 | Gavrilescu et al. | 380/255 |
| 2004/0268123 A1 | 12/2004 | Le et al. | 713/160 |
| 2005/0055573 A1 | 3/2005 | Smith | 713/201 |
| 2005/0094652 A1 | 5/2005 | Waclawsky et al. | 370/401 |
| 2005/0097357 A1 | 5/2005 | Smith | 713/201 |
| 2005/0120214 A1 * | 6/2005 | Yeates et al. | 713/171 |
| 2005/0125692 A1 | 6/2005 | Cox et al. | 726/4 |
| 2005/0129019 A1 | 6/2005 | Cheriton | 370/392 |
| 2005/0177717 A1 | 8/2005 | Grosse | 713/160 |
| 2005/0190758 A1 | 9/2005 | Gai et al. | 370/389 |
| 2005/0198412 A1 | 9/2005 | Pedersen et al. | 710/30 |
| 2006/0010483 A1 | 1/2006 | Buehler | 726/1 |
| 2006/0090208 A1 | 4/2006 | Smith | 726/26 |
| 2006/0106750 A1 | 5/2006 | Smith | 707/1 |
| 2006/0112425 A1 | 5/2006 | Smith et al. | 726/13 |
| 2006/0112426 A1 | 5/2006 | Smith et al. | 726/13 |
| 2006/0112431 A1 | 5/2006 | Finn et al. | 726/22 |
| 2006/0117058 A1 | 6/2006 | Smith et al. | 707/102 |
| 2007/0094716 A1 | 4/2007 | Farino et al. | 726/5 |
| 2007/0110248 A1 | 5/2007 | Li | 380/278 |
| 2009/0019538 A1 | 1/2009 | Pandya | 726/13 |
| 2009/0049196 A1 | 2/2009 | Smith et al. | 709/245 |
| 2009/0097490 A1 | 4/2009 | Sanderson et al. | 370/395.53 |
| 2009/0328186 A1 | 12/2009 | Pollutro | 726/13 |
| 2010/0223657 A1 | 9/2010 | Finn et al. | 726/3 |
| 2010/0235544 A1 | 9/2010 | Smith | 709/246 |
| 2011/0004923 A1 | 1/2011 | Smith | 726/4 |
| 2011/0119752 A1 | 5/2011 | Smith | 726/13 |

FOREIGN PATENT DOCUMENTS

| | | | | |
|---|---|---|---|---|
| EP | 0 849 680 A2 | 12/1997 | | G06F 12/14 |
| EP | 1 067 745 A2 | 11/1999 | | H04L 29/06 |
| JP | 2002 164937 | 6/2002 | | H04L 12/66 |
| WO | WO 2005/027464 | 3/2005 | | H04L 29/06 |

OTHER PUBLICATIONS

Valenzi, Kathleen D., Digital Signatures: An Important "Sign" of the Future of E-Government, Virginia.Edu, vol. IV, No. 2, Fall 2000, Copyright 2000, The Rector and Board of Visitors of the University of Virginia, 6 pages.

Pfleeger et al., Security in Computing, 2003, Prentice Hall, 3$^{rd}$ Ed., pp. 194-207.

Supporting Relationships in Access Control Using Role Based Access Control, Jul. 1999.

Islam, An Access Control Method with Subject-Object Key and Time Stamp, Jun. 2003, Malaysian Journal of Computer Science, vol. 16, No. 1, pp. 77-83.

IEEE Standard for Information Technology-Telecommunications and Information Exchange Between Systems-Local and Metropolitan Area Networks-Common Specifications, *Part 3: Media Access Control (MAC) Bridges*, ANSI/IEEE Std. 802.1D, 1998 Edition, Dec. 10, 1998, pp. 1-355.

Computer Systems Laboratory, National Institute of Standards and Technology, *Standard Security Label for Information Transfer*, Federal Information Processing Standards Publication 188 (FIPS PUB 188), Category: Computer Security, Subcategory: Security Labels, Sep. 6, 1994, pp. 1-25.

Microsoft® Computer Dictionary, Fifth Edition, Publisher: Microsoft Press, Pub. Date: May 1, 2002, Excerpt of terms: digital signature -digital signature standard & routable protocol—routing table, p. 656.

Stevens, Richard W., TCP/IP Illustrated vol. 1, The Protocols, Copyright © 1994 Addison Wesley Longman, Inc., pp. 112-117.

CDAT Overview, http: www.cisco.com/universaled/cc/td/doc/, Solution/sesm/sesm_313toolguid/chi1_overview.htm., Copyright 1992-2002 Cisco Systems, Inc.

* cited by examiner

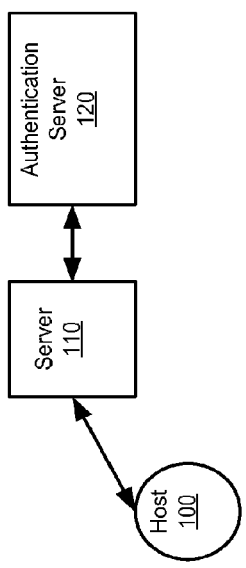

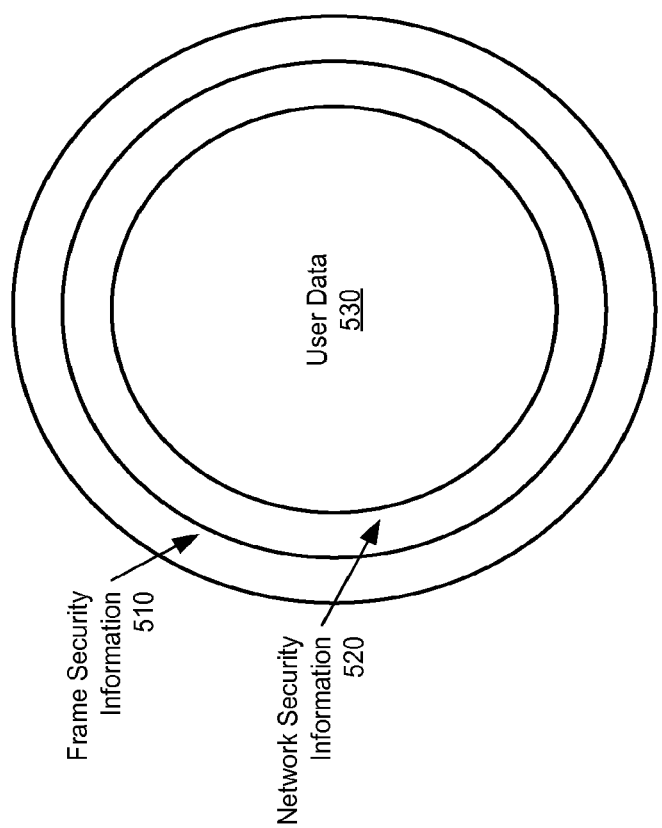

METHOD AND SYSTEM FOR INCLUDING NETWORK SECURITY INFORMATION IN A FRAME

CROSS-REFERENCE TO RELATED APPLICATIONS

This application is a continuation of U.S. patent application Ser. No. 12/779,212 filed on May 13, 2010, which is a continuation of U.S. patent application Ser. No. 10/996,101, entitled "Method and System for Including Network Security Information In A Frame", filed Nov. 23, 2004, and issuing on May 18, 2010, as U.S. Pat. No. 7,721,323, naming Norman W. Finn and Michael R. Smith as inventors. This application is assigned to Cisco Technology, Inc., the assignee of the present invention, and is hereby incorporated by reference, in its entirety and for all purposes.

BACKGROUND OF THE INVENTION

1. Field of the Invention

This invention relates to the field of information network security, and more particularly relates to a method and apparatus for securing access to a network by including network security information within the overhead of a frame.

2. Description of the Related Art

The rapid increase in the size and complexity of networks continually creates new security challenges. Furthermore, the advent of new technologies can also expose networks to new security threats. This is true of all manner of networks, including enterprise networks, service provider networks and the like. Two important considerations in securing a network are: (1) controlling access to the network and entities within the network, and (2) providing security for data frames traversing the network.

With regard to network access control, flexible network access technologies such as wireless, Dynamic Host Configuration Protocol (DHCP), virtual private network (VPN) gateways and the like allow users access to a given protected network from a variety of access or entry points. Conventionally, constraints upon access enjoyed by network users are enforced by access control lists (ACLs), which are used to implement security policies. Effective implementation of ACLs or other network security techniques often requires the dissemination of ACLs or other security information to various locations within the network. As a network grows in size and complexity, disseminating security information becomes more and more challenging.

With regard to maintaining the security of a frame, protecting the security and integrity of data being transferred between two network nodes is also becoming increasingly difficult and increasingly important, especially in the case in which the data being transmitted is itself information regarding network security. Traditionally, for a network implementing the open system interconnection (OSI) model, the standards set through the Institute of Electrical and Electronics Engineers (IEEE) have provided frame security at layer-3 and above. However, there are many protocols that do not presently provide frame security at layer-3. Examples of such protocols include net basic-input-output-system extended user interface (NetBEUI), spanning tree, link aggregation protocol, dynamic host configuration protocol (DHCP), address resolution protocol (ARP), internet packet exchange (IPX) and others. Therefore, providing frame security (e.g., at the open system's interconnect (OSI) model's layer-3) is no longer sufficient to effectively secure many networks.

What is required, then, is a solution that allows frames to carry network information in a manner that facilitates the implementation of network security at various protocol levels. Preferably, such frames should be able to carry information regarding network security in a manner that simplifies the implementation of network security policies. Also preferably, such an approach should provide for the security of individual frames, such that the information regarding network security can be secure within the frame. The approach should be implemented without incurring a disproportionate administrative burden or consuming inordinately large amounts of network resources, while at the same time the approach should be able to be implemented in existing and future protocols.

BRIEF DESCRIPTION OF THE DRAWINGS

The present invention may be better understood, and numerous objects, features, and advantages made apparent to those skilled in the art by referencing the accompanying drawings.

FIG. 1 is a block diagram illustrating an architecture for user authentication according to embodiments of the present invention.

FIG. 2 is a block diagram illustrating a forwarding table 200 according to the present invention.

FIG. 5 is a diagram illustrating a conceptual model of including network security information in frame overhead, according to embodiments of the present invention.

DETAILED DESCRIPTION OF THE INVENTION

Figure 3:
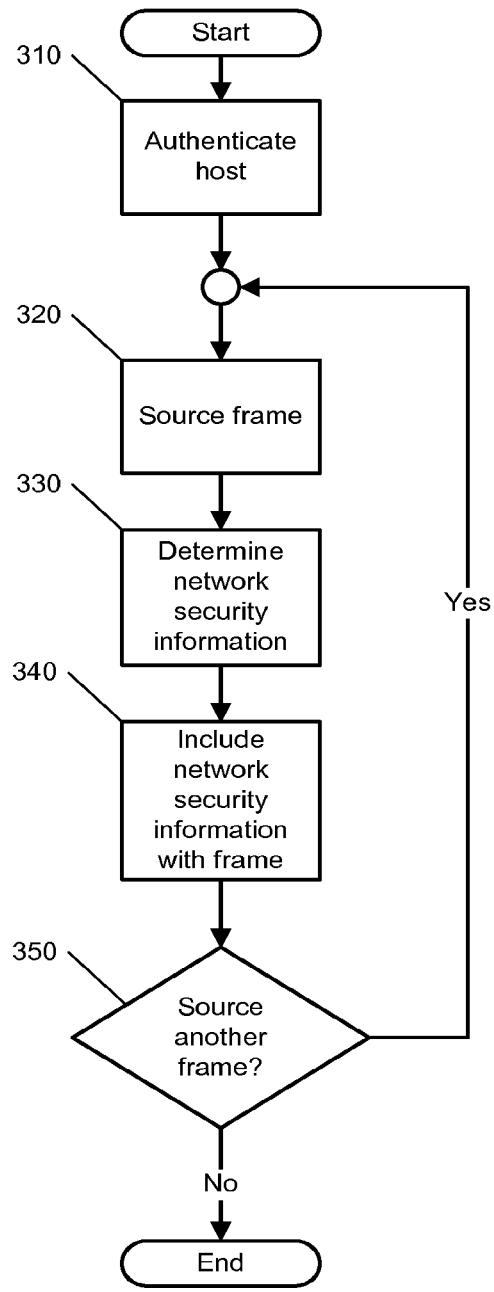
FIG. 3 is a flow diagram illustrating an example of including network security information with a frame according to embodiments of the present invention.

The following is intended to provide a detailed description of an example of the invention and should not be taken to be limiting of the invention itself. Rather, any number of variations may fall within the scope of the invention, which is defined in the claims following the description.

Introduction

The present invention provides a method and system that addresses the limitations outlined previously by providing a way to effectively transfer network security information within a network. Network security information is information related to providing security in a network. The transfer of user data from one network node to another network node is facilitated by the use of a communications model, such as the open systems interconnect (OSI) model, for example. The OSI model sets forth a seven-layer protocol stack and describes how control of user data is passed from one protocol layer to the next. As the user data passes through certain protocol layers, the user data is encapsulated with a header that is specific to the protocol layer.

For example, a layer-2 network node can encapsulate the user data with a layer-2 header that includes link layer control information, such as a media access control (MAC) source address and a MAC destination address. At the link layer of the OSI model, data is transmitted in blocks commonly referred to as frames. When a frame is sent from a source network device to a destination network device, the source network device formats the frame by following a formatting protocol understood by the both the source network device and the destination network device. One example of a layer-2 protocol is the Ethernet protocol. According to the Ethernet protocol, the layer-2 header includes a destination MAC address followed by a source MAC address and a link/type field.

In an embodiment of the present invention, the source network device obtains network security information and inserts the network security information after the link/type field of the frame. However, if the destination network device is not notified of the presence of the network security information within the frame, the destination network device will not be able to parse the frame. One solution to this problem is to use a link/type field value to indicate the presence of network security in the frame. Thus, if the destination network device understands the link/type field value, the destination network device will be able to parse the frame.

The present invention also includes numerous other embodiments for including network security information in a frame. For example, the network security information can be included in the header of the frame, and a header length field can then be used to indicate the presence of the network security information in the header. In other embodiments, the network security information can be included in a multi-protocol label switching (MPLS) header, an 802.1q tag, a security header, or other portion of a frame. As with the link/type field example, in any embodiment of the present invention the source network device includes the network security information in the frame in a manner that allows another device in the network to be able to parse the frame.

The following disclosure focuses on including network security information in Ethernet frames; however, one of skill in the art will recognize that these principles can be implemented in other types of network frames. The principles of the present invention can also be implemented at other protocol layers. For example, the network security information can be included in the header of a layer-3 internet protocol (IP) packet. Furthermore, the present invention can be implemented in other communications models and protocols, such as internet packet exchange (IPX), systems network architecture (SNA), AppleTalk, and other such communication models and protocols.

The present invention provides a number of advantages thereby. Key advantages of the present invention include efficient distribution of network security information, simplified security management, and the ability to provide network security by carrying network security information within frames using new and existing protocols.

Obtaining Network Security Information

FIG. 1 is a block diagram illustrating an architecture for user authentication according to embodiments of the present invention. Network security information can be sent to a host 100 when the user is authenticated on the network. The following examples can use, for example, the remote authentication dial-in user server (RADIUS) protocol, which provides centralized authentication, authorization and accounting for various types of access. User authentication is initiated by a user, who attempts to log into host 100. The user (not shown) causes host 100 to act as a supplicant, and so, send a start message to a server 110 (also referred to as an authenticator). Server 110 responds to host 100 with a request/identify message, to which host 100 responds with a response/identity message, based on the user's response. This response/identity message can be, for example, the typical user name and password combination. Server 110 passes this information to an authentication server 120.

Authentication server 120 responds with an access-challenge. It will be noted that a variety of exchanges occur between server 110 and authentication server 120 during authentication, and that these are meant to be merely exemplary. Such exchanges will vary, depending on the authentication protocol employed. Once the access-challenge exchange has completed, server 110 interacts with host 100 by forwarding the challenge from authentication server 120 to host 100. Host 100, in this example, responds with a one time password, which server 110 forwards to authentication server 120. Assuming that the password is accepted by authentication server 120, authentication server 120 responds with an access-accept message that causes server 110 to authorize a network address for host 100.

Embodiments of the present invention rely on this authentication process to allow for the dissemination of network security information to various network devices. The present invention can employ an authentication procedure such as that presented in connection with FIG. 1 to provide the ability to transport network security information from authentication server 120 to an ingress network access device. In the RADIUS protocol, a vendor-specific attribute containing the network security information to be passed to server 110 (and, ultimately, to the ingress switch) uses the RADIUS access-accept response. Thus, the network security information can be obtained when the user is authenticated on the network. Alternatively, if the operating system of host 100 is trusted, the network security information can come from host 100 itself. If such is the case, each application may tag a given frame differently, based on the application sourcing the frame.

It will be noted that, in the original IEEE 802.1X specification, the entire port is authenticated when a single valid authentication is made on the port. Thereafter, any host attached to that port is considered authenticated. In the same manner, although not mandatory, the simplest method of obtaining the network security information is to mark the entire port as authenticated upon the first valid authentication. The network security information provided by the initial authentication is then used and installed in the ingress port.

FIG. 2 is a block diagram illustrating a forwarding table 200 according to the present invention. Forwarding table 200 includes a number of forwarding table entries (depicted in FIG. 2 as forwarding table entries 210(1)-(N)). Each of forwarding table entries 210(1)-(N) includes a number of fields, certain of which are depicted in FIG. 2. Among these fields are a MAC address field (depicted as MAC address fields 220(1)-(N)), a virtual local area network (VLAN) identifier field (depicted as VLAN identifier fields 230(1)-(N)), a port identifier field (depicted as port identifier fields 240(1)-(N)), and a network security information field (depicted as network security information fields 250(1)-(N)).

When the MAC address and the VLAN have been authenticated on a given port, the network security information retrieved via the RADIUS authentication is assigned to the MAC address/VLAN identifier combination. This information appears in forwarding table 200 in MAC address fields 220(1)-(N) and VLAN identifier fields 230(1)-(N). Forwarding table 200 thus contains the MAC address/VLAN identifier combinations that can be used as a look-up key with the result of the look-up providing the port identifier (as stored in the appropriate one of port identifier fields 240(1)-(N)) and the network security information (as stored in a corresponding one of network security information fields (250(1)-(N)). The particular one of forwarding table entries 210(1)-(N) is preferably static on the ingress switch, and in such a case, removal should be triggered by the authentication protocol employed, and not the aging criteria that are typically employed with forwarding table entries.

After receiving the network security information, a network device can include the network security information in a frame that is sourced by that device or a frame that passes through the device. It will be noted that, in one implementation, when a frame is sent by a host such as host 100, the layer-2 learning look-up also derives the network security information for the frame by looking up the frame's contents in the forwarding table. Alternatively, the switch's layer-2 learning look-up can be designed to extract the network security information from the frame itself. This network security information can be used to tag the frame for identification as having been generated by a user in a given user group. Such a tag is referred to herein as a user group identifier (UGI). According to one embodiment, this UGI can be a security group tag. The UGI is inserted into the frame for use in the subsequent processing of the frame. For example, the UGI can be inserted into the layer-2 header, making such information available to layer-3 routers, as well as layer-2 switches.

When the network security information is a UGI, network security can be provided by enforcing security policies defined in a user group permissions list (UGPL) that is associated with the UGI. The network access permitted a user is conventionally based on the group(s) to which the user belongs, the role(s) assigned to the user by the enterprise, the privilege(s) the user has as an ISP customer or similar criteria. UGPLs implement role-based access control of network traffic by enforcing the permissions to be applied to that network traffic, based on the role(s) of the user generating the network traffic. A user is given membership in one or more groups based on that user's roles. In turn, UGPLs are applied in deciding whether to permit communication between groups. The UGI information carried in a frame can be used to determine which UGPL should be applied to the frame.

Before the appropriate UGPL can be applied to a frame, a determination is made as to the user group of the frame's destination (destination user group). The destination user group can be determined by employing information in the forwarding information base (FIB) provided during address resolution by the address resolution protocol (ARP) (i.e., the IP FIB). For most cases involving network traffic using IP, the destination user group can be derived from the FIB. On the egress network layer-3 edge of the network, the FIB will be populated with the resolved host prefix after ARP resolution is performed. Since the ARP response is the trigger for the FIB entry update and needs to be received before any traffic flows to the host, the ARP response is used as the trigger to insert the destination user group into the FIB entry.

Other mechanisms for determining the destination user group are available, and the exact method of deriving the destination user group depends on the platform and network connectivity to the host. After the destination user group is determined, the network security information (UGI of the source) and the destination user group are used to determine the UGPL that applies to the frame. In one embodiment, the UGPL is accessed through a user group identifier matrix. After the UGPL is obtained, network security can be provided by enforcing the permissions denoted in the UGPL.

For an example of providing network security by using role-based access control, see patent application Ser. No. 10/659,614, filed Sep. 10, 2003, entitled "METHOD AND APPARATUS FOR PROVIDING NETWORK SECURITY USING ROLE-BASED ACCESS CONTROL," having Michael R. Smith as inventor, which is hereby incorporated by reference, in its entirety and for all purposes.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Including Network Security Information in a Frame

FIG. 3 is a flow diagram illustrating an example of including network security information with a frame according to embodiments of the present invention. As described previously, when a user attempts the log into a host, the host is typically authenticated (step 310). During authentication, network security information is sent to the host. In other embodiments, this network security information can also be sent to the host before or after authentication. The network security information can be determined by accessing a forwarding table, such as forwarding table 200, or another acquisition mechanism (step 320).

As previously mentioned, the network security information can be a UGI. In this embodiment, numerous steps can be included in determining and obtaining the UGI. For example, the UGI can be created and made available through the use of a UGI matrix. For an example of determining network security information, see patent application Ser. No. 10/970,532, filed Oct. 21, 2004, entitled "METHOD AND SYSTEM FOR GENERATING USER GROUP IDENTIFIERS," which issued as U.S. Pat. No. 7,669,244 on Feb. 23, 1010 having Michael R. Smith as inventor, which is hereby incorporated by reference, in its entirety and for all purposes.

After authenticating the host and determining the network security information, a frame sourced at the host is tagged with the network security information (steps 330 and 340). In an alternative embodiment, the network security information is determined after the frame is sourced; in other words, step 330 can be performed before step 320. In any embodiment, the network security information is still included with the frame (step 340).

As will be appreciated, the host does not need to be authenticated each time a frame is sourced. If the host is sourcing multiple frames, authentication is not repeated as long as the authentication is valid (step 350). Furthermore, network security information does not need to be determined each time a frame is sourced. Once the network security information is determined, the network security information can be included in multiple frames.

Network security information can be included in many different locations within a frame. The techniques used to tag a frame with network security information can also vary from network to network. How and where the network security information is included in the frame depends on many factors. For example, the network security information can be carried in a different location within a frame depending on the type of protocol used by the network. It will be noted that frame security information provides for securing a portion of the frame, and the network security information can be included in the secure portion of the frame. Thus, the frame security information can secure the frame and the network security information. While specific embodiments for including network security information in a frame are discussed, one of ordinary skill in the art will recognize that the principles of the present invention can be applied in other types of frames and networks.

Figure 4A:
FIG. 4A is a block diagram illustrating an example of a frame with network security information in overhead of the frame according to embodiments of the present invention. Frame overhead is any frame data that is added to the revenue-generating user data.

FIG. 4A is a block diagram illustrating an example of a frame with network security information in overhead of the frame according to embodiments of the present invention. Frame overhead is any frame data that is added to the revenue-generating user data. A header field 400, which can be a MAC security header or another type of security header, includes a frame security information field 405. Frame security information field 405 can be encryption information, integrity check information, or any other type of information that provides frame security. When the frame security information is encryption information, frame security is provided by encrypting the frame. Encryption of the frame, including a network security information field 410, is accomplished by transforming the frame data from plain-text to cipher-text. Encryption can protect confidentiality and authenticity of the data carried in the frame. Any of the numerous encryption techniques known to those of skill in the art can be used to encrypt the frame.

As shown in FIG. 4A, a network security information field 410 is included in the frame between header field 400 and a user data field 420. Thus, network security information field 410 is secured by frame security information field 405. As previously discussed, network security information field 410 can be a user group identifier (UGI) that provides access to a UGPL. The UGI can include a version number, reserve bits and a tag value. The version number is included to provide flexibility in the format of the UGI. In an alternative embodiment, network security information field 410 is a security association field. In this embodiment, the security association field is associated with a UGI, but does not include the UGI itself. Thus, the frame need not actually carry the user group identifier in order to provide access to a UGPL.

Figure 4B:
FIG. 4B is a block diagram illustrating an example of a frame with network security information and an 802.1q tag included in the frame according to embodiments of the present invention.

FIG. 4B is a block diagram illustrating an example of a frame with network security information and an 802.1q tag included in the frame according to embodiments of the present invention. The IEEE 802.1q standard sets forth an internal tagging mechanism that inserts a four byte tag field after the layer-2 header of a frame. In the embodiment shown in FIG. 4B, an 802.1q tag 415 is included after network security information 410. 802.1q tag 415 is followed by user data field 420, which is followed by a trailer field 425. Instead of including frame security information field 405 in header field 400, frame security information field 405 is included in trailer field 425.

When frame security information field 405 is included in a frame trailer, as in the example shown in FIG. 4B, frame security information field 405 can be integrity check information. A frame destination device can use the integrity check information to verify the integrity of the frame. Integrity check information is used to prevent accidental or deliberate but unauthorized modification of data carried in the frame. The integrity check information can be a checksum that produces an unchangeable 'fingerprint' that is carried with the frame. When the frame reaches the destination, the recipient can verify that the data has not been altered in transit by verifying the checksum. Thus, integrity check information can secure the network security information.

Both FIGS. 4A and 4B show that network security information field 410 is included in the frame after header field 400. In other embodiments, network security information field 410 can be included within header field 400 or at an end of header field 400. As long as the source network device can communicate the location of network security field 410 to the destination network device, network security information field 410 can be included in many different locations within the frame.

One advantage of providing network security in the frame configurations shown in FIGS. 4A and 4B is that the network does not necessarily need to implement a new protocol to include the network security information with the frame. Thus, the present invention can be used in existing protocols without the need to alter the protocols (e.g., acquiring a new ethertype). For example, the present invention can be implemented in a security protocol, such as IEEE 802.1AE. Before an 802.1AE frame is transmitted from a source network device to a destination network device, the source network device and the destination network device engage in a negotiation process. As part of this negotiation process, the source and destination network devices exchange information to verify each other's identity. If an encryption algorithm is going to be used, the source and destination network devices also pass enough information back and forth in order to select an encryption key for decoding the encrypted frame. During this exchange of information, the source network device can indicate to the destination network device that the destination network device can expect network security information to be included in the frame. The source network device can also indicate to the destination network device the location within the frame at which the network security information can be found.

Figure 4C:
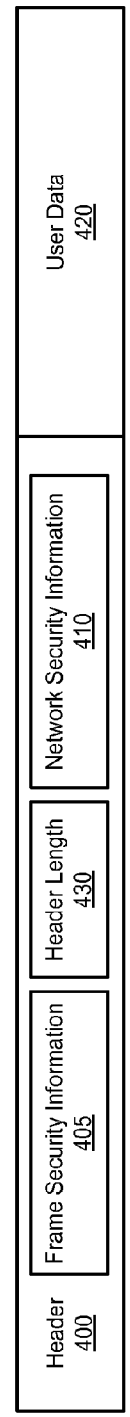
FIG. 4C is a block diagram illustrating an example of a frame with network security information, frame security information, and a header length field in overhead of the frame according to embodiments of the present invention.

FIG. 4C is a block diagram illustrating an example of a frame with network security information, frame security information, and a header length field in overhead of the frame according to embodiments of the present invention. Header field 400 includes frame security information field 405, a header length field 430 and network security information field 410. Header length field 430 indicates a length of header field 400, signaling to a device that receives the frame the extra length of the header that includes the network security information. Thus, a network device capable of understanding header length field 430 need not understand the information that follows header length field 430 in order to be able to parse the frame. The format of header length field 430 can be determined during the negotiation process between the source network device and the destination network device.

One advantage of the frame configuration shown in FIG. 4C is that a frame analyzer can be configured to parse the header length field by participating in the negotiation process between the source network device and the destination network device. Thus, when a frame is secured without obscuring the frame's contents (e.g., including integrity check information within the frame instead of encrypting the frame), the frame analyzer can still parse the frame. Another benefit of the foregoing configuration is that such a configuration does not complicate existing hardware. For example, the destination network device checks that the length bits are correct, but the check is part of a fixed-pattern, fixed-length check that can already be performed during frame validation.

Figure 4D:
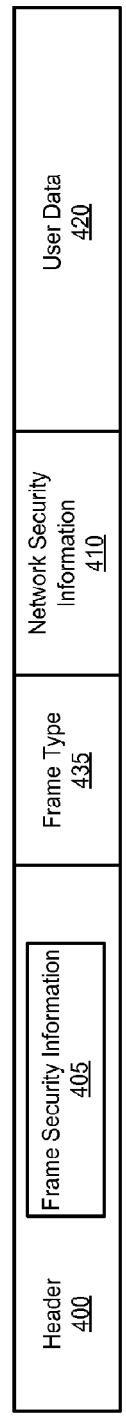
FIG. 4D is a block diagram illustrating an example of a frame with network security information and a frame type field in overhead of the frame according to embodiments of the present invention.

FIG. 4D is a block diagram illustrating an example of a frame with network security information and a frame type field in overhead of the frame according to embodiments of the present invention. Header field 400 is followed by a frame type field 435. Frame type field 435 designates a type, or protocol of the frame. One example of a frame type field is an ethertype field. A network device that can parse the ethertype can parse the frame. In the present invention, the ethertype indicates that the frame is carrying network security information field 410 in overhead of the frame. Details on how network security information field 410 is included in this manner were discussed previously in conjunction with FIG. 3.

Figure 4E:
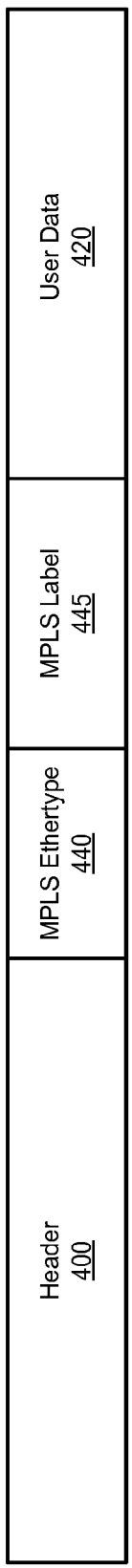
FIG. 4E is a block diagram illustrating an example of a frame with network security information, frame security information, and a header length field in overhead of the frame according to embodiments of the present invention.

FIG. 4E is a block diagram illustrating an example of a frame with network security information, frame security information, and a header length field in overhead of the frame according to embodiments of the present invention. Header field 400 is followed by an MPLS ethertype field 440. MPLS ethertype field 440 indicates that the frame is carrying an MPLS frame. In one embodiment, the value of MPLS ethertype field 440 is either x8847 or x8848.

An MPLS label 445 follows MPLS ethertype field 440. MPLS label 445 can contain frame forwarding information, which is used to ensure that all frames in a particular flow take the same route through a network. MPLS label 445 can be added to the frame by an MPLS router, for example. An MPLS edge router is positioned at the edge of the network and performs packet analysis and classification before the packet enters the core network. Label switch routers, or routers within the core network, can examine the label and forward the frame without using lookup tables and without computing the forwarding path for each frame. The MPLS edge router that receives the frame can remove MPLS label 445. According to one embodiment of the present invention, MPLS label 445 includes network security information. MPLS label 445 can be used to identify a grouping of the frame, and this grouping information can be used as network security information. For example, access control can be applied by using a permissions list associated with the grouping information. The grouping information can be included in the frame before or after the MPLS routing labels. The MPLS edge routers and the label switch routers can be configured interpret the grouping information as network security information. This approach for providing network security is similar, in some respects, to the network security technique that uses UGIs and UGPLs.

Figure 4F:
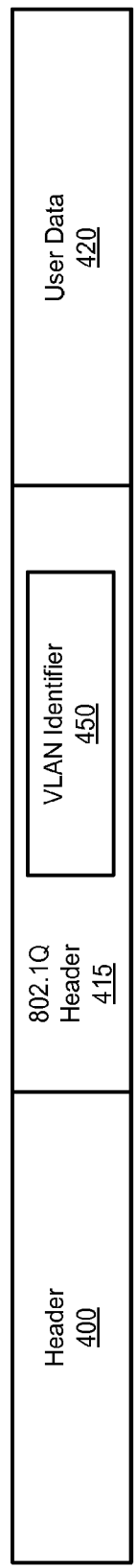
FIG. 4F is a block diagram illustrating an example of a frame with network security information and a virtual local area network (VLAN) identifier in overhead of the frame according to embodiments of the present invention.

FIG. 4F is a block diagram illustrating an example of a frame with network security information and a virtual local area network (VLAN) identifier in overhead of the frame according to embodiments of the present invention. A network entity can insert VLAN identifiers into frames that will traverse a virtual local area network. In this embodiment, the frame includes 802.1q tag 415. 802.1q tag 415 includes a VLAN identifier field 450. In one embodiment, VLAN identifier field 450 is a twelve bit field that uniquely identifies the VLAN to which the frame belongs, and in certain embodiments, has a value between 0 and 4095. VLAN identifier field 450 can also be interpreted as network security information. VLAN identifier field 450 can be used as network security information by interpreting the VLAN to which the network entity belongs as a security group, and interpreting VLAN identifier field 450 as a security group identifier. VLAN identifier field 450 provides access to a permissions list that defines security policies for the VLAN associated with VLAN identifier field 450.

Figure 4G:
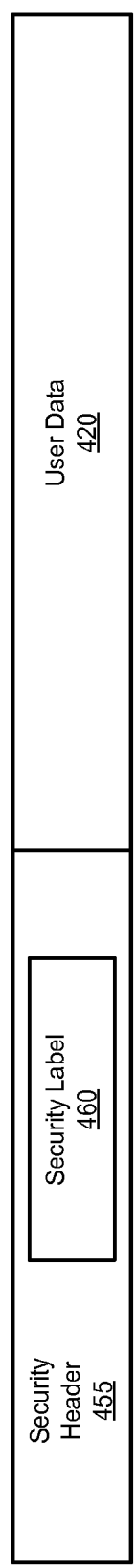
FIG. 4G is a block diagram illustrating an example of a frame with a security header and a security label in overhead of the frame according to embodiments of the present invention.

FIG. 4G is a block diagram illustrating an example of a frame with a security header and a security label in overhead of the frame according to embodiments of the present invention. A security header field 455 includes a security label field 460. Security header field 455 can also include a station identification field, flag fields, and a fragment identifier field. Security header field 455 can also include a clear header and a protected header, with security label field 460 included in the protected header. Security label field 460 comprises network security information. In one embodiment, security header field 455 is an 802.10 header that offers connectionless security for all MAC layers in the IEEE family.

In FIGS. 4A, 4B, 4C, 4D, 4E and 4F, the frame header can include a source address and a destination address. Header field 400 can be a media access control security header (MACsec header), in compliance with 802.1AE. The 802.1AE task group states that the purpose of 802.1AE is to "specify provision of connectionless user data confidentiality, frame data integrity, and data origin authenticity by media access independent protocols and entities that operate transparently to MAC Clients." Thus, including network security information with an 802.1AE frame creates a secure frame that is also capable of providing network security at the link layer.

FIG. 5 is a diagram illustrating a conceptual model of including network security information in frame overhead, according to embodiments of the present invention. A frame security information field 510 encapsulates a network security information field 520 and a user data field 530. Thus, network security information field 520 is included in a secure portion of the frame, and so is protected by the mechanism used to provide the frame security. Although network security information field 520 is shown to encapsulate user data field 530, only frame security information field 510 provides security for the frame.

Example of a Network Device

Figure 6:
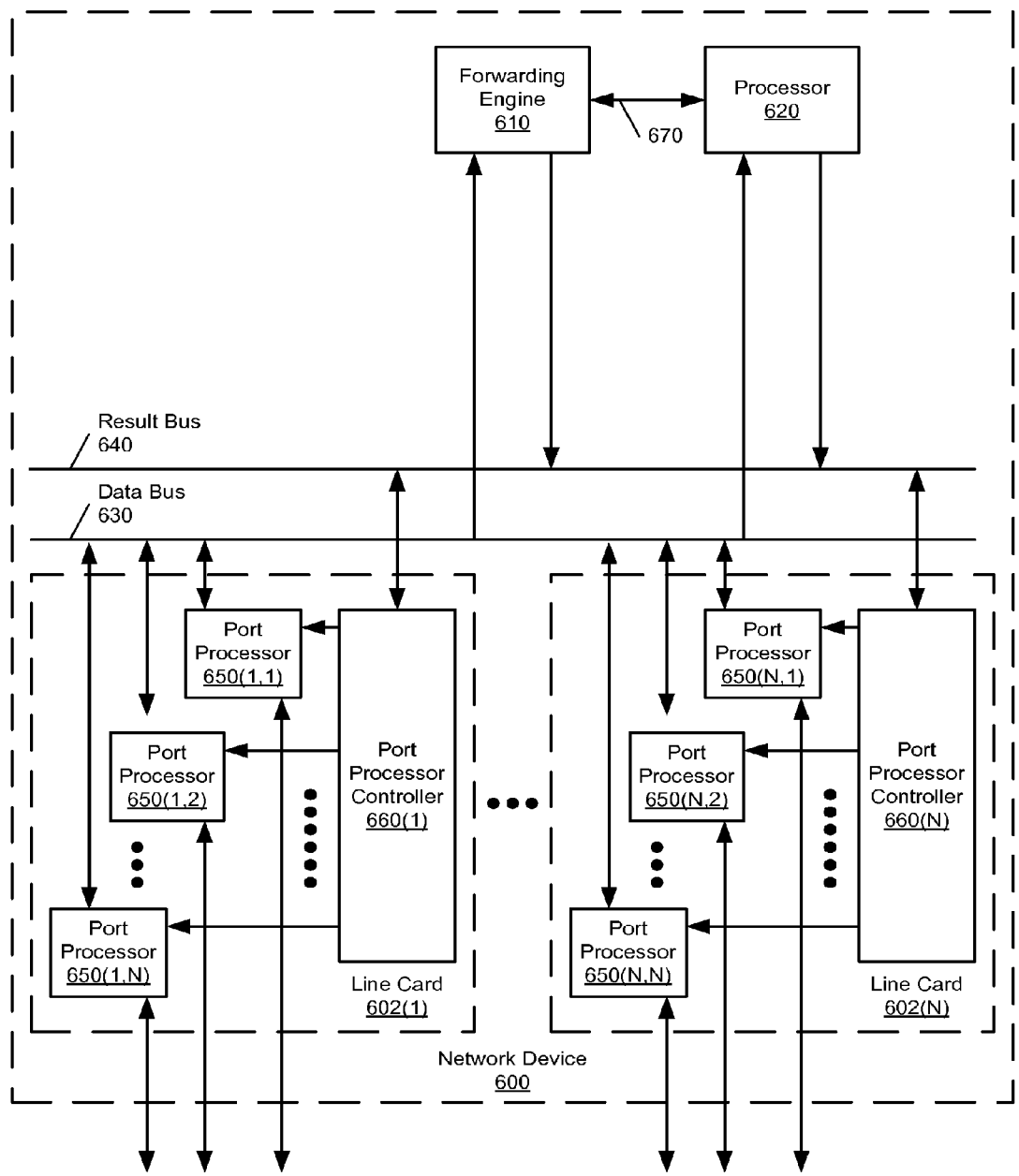
FIG. 6 is a block diagram illustrating a network device according to the present invention in greater detail.

FIG. 6 is a block diagram illustrating a network device. In this depiction, network device 600 includes a number of line cards (line cards 602(1)-(N)) that are communicatively coupled to a forwarding engine 610 and a processor 620 via a data bus 630 and a result bus 640. Line cards 602(1)-(N) include a number of port processors 650(1,1)-(N,N) which are controlled by port processor controllers 660(1)-(N). It will also be noted that forwarding engine 610 and processor 620 are not only coupled to one another via data bus 630 and result bus 640, but are also communicatively coupled to one another by a communications link 670.

When a packet is received, the packet is identified and analyzed by a network device such as network device 600 in the following manner, according to embodiments of the present invention. Upon receipt, a packet (or some or all of its control information) is sent from the one of port processors 650(1,1)-(N,N) at which the packet was received to one or more of those devices coupled to data bus 630 (e.g., others of port processors 650(1,1)-(N,N), forwarding engine 610 and/or processor 620). Handling of the packet can be determined, for example, by forwarding engine 610. For example, forwarding engine 610 may determine that the packet should be forwarded to one or more of port processors 650(1,1)-(N,N). This can be accomplished by indicating to corresponding one(s) of port processor controllers 660(1)-(N) that the copy of the packet held in the given one(s) of port processors 650(1,1)-(N,N) should be forwarded to the appropriate one of port processors 650(1,1)-(N,N).

In the foregoing process, network security information can be included in a frame sourced by network device 600 in a number of ways. For example, forwarding engine 610 can be used to detect the need for the inclusion of network security information in the packet, and processor 620 can be called into service to provide the requisite network security information. This network security information can be included in the packet during the transfer of the packet's contents from one of port processors 650(1,1)-(N,N) to another of port processors 650(1,1)-(N,N), by processor 620 providing the requisite information directly, or via forwarding engine 610, for example. The assembled packet at the receiving one of port processors 650(1,1)-(N,N) can thus be made to contain the requisite network security information.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method comprising:
receiving an authentication request at an authentication server, wherein
the authentication server is configured to receive the authentication request from a network device by virtue of comprising a network interface configured to be communicatively coupled to the network device,
the authentication request comprises
an identifier, and
the identifier is configured to identify an entity requesting authentication via the network device;
authenticating the entity, wherein
the authenticating comprises
determining network security information for the entity, wherein the determining uses the identifier,
the network security information comprises a user group identifier,
the user group identifier is configured to be used to maintain security of a network to which the network device is communicatively coupled, by virtue of being configured to be included in a secure portion of a frame, and
the secure portion of the frame is secured using frame security information of the frame; and
sending a response to the network device via the network interface, wherein
the response comprises
the network security information.

2. The method of claim 1, further comprising:
including the network security information in the frame, wherein
the entity is a host computer,
the frame is sourced by the host computer, and
the host computer is communicatively coupled to the network device.

3. The method of claim 2, wherein
the network security information is included in the secure portion of the frame by virtue of being included in a first portion of the frame, wherein
the first portion is within an overhead portion of the frame.

4. The method of claim 1, wherein
the network security information is determined based on a result of accessing a forwarding table.

5. The method of claim 1, wherein
the entity is one of a user or a host computer.

6. The method of claim 1, wherein
the authentication request further comprises
the entity is a host computer, and
an address of the host computer, and
the method further comprises
assigning the network security information to a combination of the address and the identifier.

7. The method of claim 6, further comprising:
receiving the frame at the
network device;
accessing forwarding information, wherein
the forwarding information is stored at the network device, and
the forwarding information comprises
the network security information, the address, and
the identifier; and
determining that the network security information is to be associated with the frame, wherein
the network security information is determined based on a result of the accessing.

8. The method of claim 7, wherein
the forwarding information is a forwarding table,
the accessing comprises
searching a plurality of entries of the forwarding table, and
identifying an entry of the entries, and
the entry comprises the network security information.

9. The method of claim 6, further comprising:
authenticating the combination of the address and the identifier, wherein the identifier is a logical network identifier; and
retrieving the network security information using the combination of the address and the identifier.

10. The method of claim 9, further comprising:
determining the frame security information, wherein
the frame security information is configured to facilitate security of an overhead portion of the frame,
the overhead portion of the frame comprises the network security information, and
the frame security information is configured to prevent access to the overhead portion of the frame.

11. The method of claim 10, wherein
the address is a media access control (MAC) address,
the logical network identifier is a virtual local area network (VLAN) identifier,
the combination of the address and the identifier identifies the entity as being coupled to a port of the network device,
the network security information is retrieved from a host computer, and
the assigning assigns the network security information to a combination of the MAC address and the VLAN identifier.

12. The method of claim 10, further comprising:
including the network security information in the frame, wherein
the network security information is included in the overhead portion of the frame; and
including the frame security information in the frame.

13. The method of claim 12, further comprising:
sending the frame with the network security information to another network device, wherein
the another network device is comprised in or coupled to the network.

14. The method of claim 13, further comprising:
processing the frame by
accessing the network security information; and
determining network access permitted to the frame, wherein
the network access permitted to the frame is determined by accessing security policies for the frame, and
the security policies for the frame are defined in a user group permissions list associated with the network security information of the frame.

15. A computer networking system comprising:
an authentication server, comprising
a processor,
a network interface, coupled to the processor,
a non-transitory computer-readable storage medium, coupled to the processor, and
a plurality of instructions, encoded in the non-transitory computer-readable storage medium and configured to cause the processor to
receive an authentication request at an authentication server, wherein
the authentication server is configured to receive the authentication request from a network device by virtue of comprising a network interface configured to be communicatively coupled to the network device,
the authentication request comprises
an identifier, and
the identifier is configured to identify an entity requesting authentication via the network device,
authenticate the entity, wherein
the authenticating comprises
determining network security information for the entity, wherein
the determining uses the identifier,
the network security information comprises a user group identifier,
the user group identifier is configured to be used to maintain security of a network to which the network device is communicatively coupled, by virtue of being configured to be included in a secure portion of a frame, and
the secure portion of the frame is secured using frame security information of the frame, and
send a response to the network device via the network interface, wherein
the response comprises
the network security information.

16. The computer networking system of claim 15, wherein
the authentication request further comprises
the entity is a host computer, and
an address of the host computer, and
the plurality of instructions is further configured to cause the processor to
assign the network security information to a combination of the address and the identifier.

17. The computer networking system of claim 16, wherein the plurality of instructions is further configured to cause the processor to:
receive the frame at the network device;
access forwarding information, wherein
the forwarding information is stored at the network device, and
the forwarding information comprises
the network security information,
the address, and
the identifier; and
determine that the network security information is to be associated with the frame, wherein
the network security information is determined based on a result of the accessing.

18. The computer networking system of claim 16, wherein the plurality of instructions is further configured to cause the processor to:
authenticate the combination of the address and the identifier, wherein the identifier is a logical network identifier; and
retrieve the network security information using the combination of the address and the identifier.

19. The computer networking system of claim 18, further comprising:
determining the frame security information, wherein the frame security information is configured to facilitate security of an overhead portion of the frame, the overhead portion of the frame comprises the network security information, and the frame security information is configured to prevent access to the overhead portion of the frame.

20. A computer program product comprising:

a plurality of instructions, comprising a first set of instructions, executable on a network device, configured to receive an authentication request at an authentication server, wherein the authentication server is configured to receive the authentication request from a network device by virtue of comprising a network interface configured to be communicatively coupled to the network device, the authentication request comprises an identifier, and the identifier is configured to identify an entity requesting authentication via the network device, a second set of instructions, executable on the network device, configured to authenticate the entity, wherein the authenticating comprises determining network security information for the entity, wherein the determining uses the identifier, the network security information comprises a user group identifier, the user group identifier is configured to be used to maintain security of a network to which the network device is communicatively coupled, by virtue of being configured to be included in a secure portion of a frame, and the secure portion of the frame is secured using frame security information of the frame, a third set of instructions, executable on the network device, configured to send a response to the network device via the network interface, wherein the response comprises the network security information; and a non-transitory computer-readable storage medium, wherein the instructions are encoded in the non-transitory computer-readable storage medium.

* * * * *